United States Patent
Schubert et al.

(10) Patent No.: US 7,829,039 B2
(45) Date of Patent: Nov. 9, 2010

(54) MIXER SYSTEM, REACTOR AND REACTOR SYSTEM

(75) Inventors: Klaus Schubert, Karlsruhe (DE);
Manfred Kraut, Linkenheim-Hochstetten (DE); Lothar Bohn, Hambruecken (DE); Achim Wenka, Remchingen (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 522 days.

(21) Appl. No.: 11/910,639

(22) PCT Filed: Mar. 23, 2006

(86) PCT No.: PCT/EP2006/002648
§ 371 (c)(1),
(2), (4) Date: Oct. 4, 2007

(87) PCT Pub. No.: WO2006/105870
PCT Pub. Date: Oct. 12, 2006

(65) Prior Publication Data
US 2008/0165616 A1 Jul. 10, 2008

(30) Foreign Application Priority Data
Apr. 5, 2005 (DE) .................. 10 2005 015 433

(51) Int. Cl.
*B01J 19/00* (2006.01)
*B01F 15/00* (2006.01)
*B01F 13/00* (2006.01)
*B01F 5/06* (2006.01)

(52) U.S. Cl. .............. 422/224; 422/129; 422/130; 366/134; 366/162.4; 366/165.1; 366/167.1; 366/336; 366/338

(58) Field of Classification Search ............. 422/200, 422/224, 129, 130; 366/134, 144, 145, 162.4, 366/165.1, 167.1, 336, 338
See application file for complete search history.

(56) References Cited

U.S. PATENT DOCUMENTS

| | | | |
|---|---|---|---|
| 5,573,334 A | 11/1996 | Anderson | |
| 5,803,600 A | 9/1998 | Schubert et al. | |
| 6,082,891 A | 7/2000 | Schubert et al. | |
| 6,555,629 B1* | 4/2003 | Bayer et al. | 526/64 |
| 6,935,768 B2 | 8/2005 | Lowe et al. | |
| 6,982,064 B1* | 1/2006 | Ehrfeld et al. | 422/130 |
| 2003/0039169 A1* | 2/2003 | Ehrfeld et al. | 366/336 |
| 2004/0125689 A1 | 7/2004 | Ehrfeld et al. | |
| 2004/0213083 A1 | 10/2004 | Fujiwara et al. | |
| 2007/0140042 A1* | 6/2007 | Schanz et al. | 366/130 |
| 2008/0106968 A1 | 5/2008 | Schanz et al. | |

FOREIGN PATENT DOCUMENTS

| | | |
|---|---|---|
| DE | 44 16 343 | 11/1995 |
| DE | 195 40 292 | 1/1997 |
| DE | 19917330 | 10/2000 |

(Continued)

*Primary Examiner*—Walter D Griffin
*Assistant Examiner*—Natasha Young
(74) *Attorney, Agent, or Firm*—Leydig, Voit & Mayer, Ltd.

(57) ABSTRACT

A mixer system for mixing at least two fluids includes a plurality of micromixers that are fluidically connected in parallel. The micromixers are integrated into a guide matrix and are fluidically connected via feed lines for the fluids to be mixed.

18 Claims, 15 Drawing Sheets

FOREIGN PATENT DOCUMENTS

| | | |
|---|---|---|
| DE | 10026903 | 1/2002 |
| DE | 10041823 | 3/2002 |
| DE | 20201753 | 4/2002 |
| DE | 10123092 | 11/2002 |
| DE | 10123093 | 11/2002 |
| DE | 103 33 922 | 2/2005 |
| EP | 1160241 | 12/2001 |
| EP | 1 473 077 | 11/2004 |
| WO | WO 00/76648 A1 * | 12/2000 |
| WO | 02/89966 | 11/2002 |
| WO | WO 2005/018785 A1 * | 3/2005 |

* cited by examiner

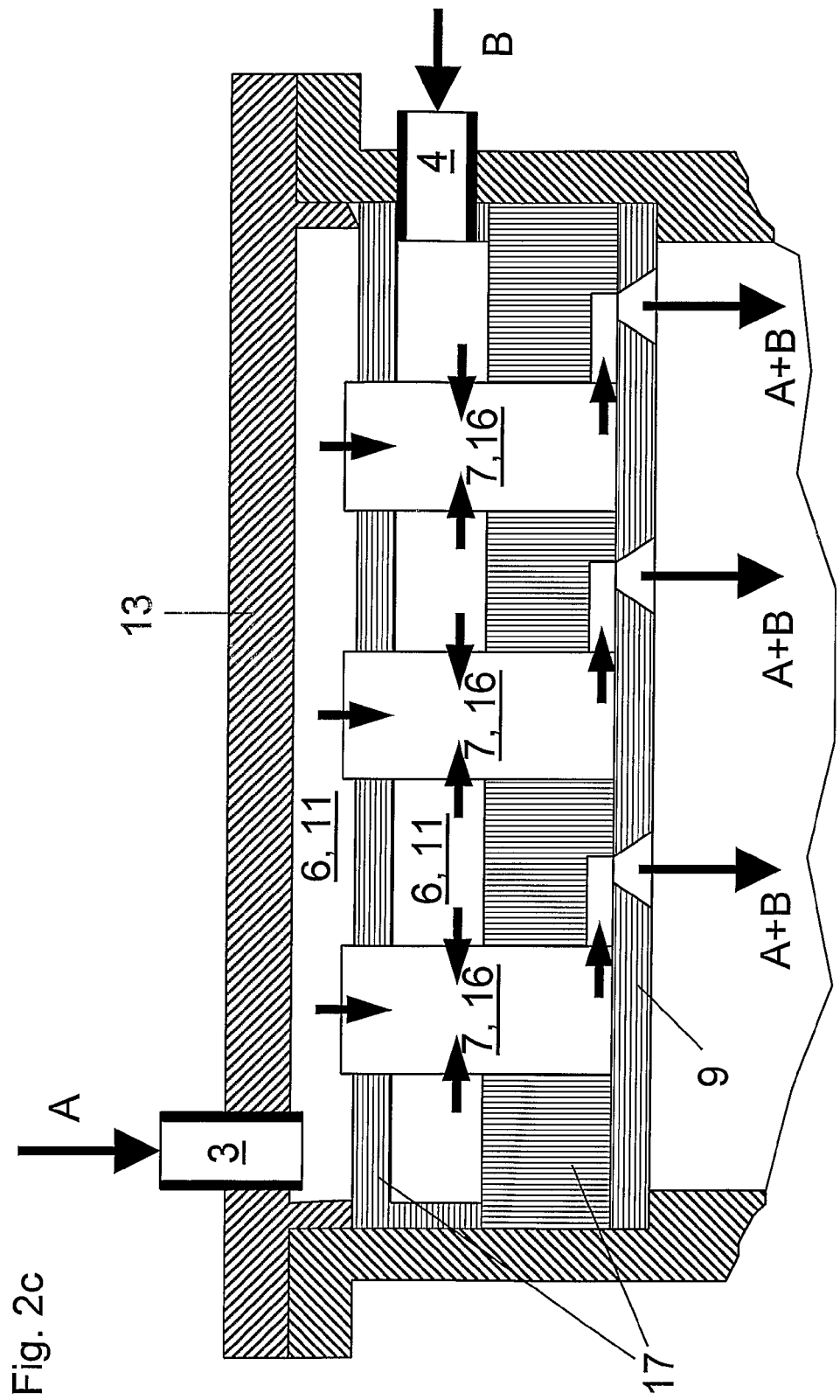

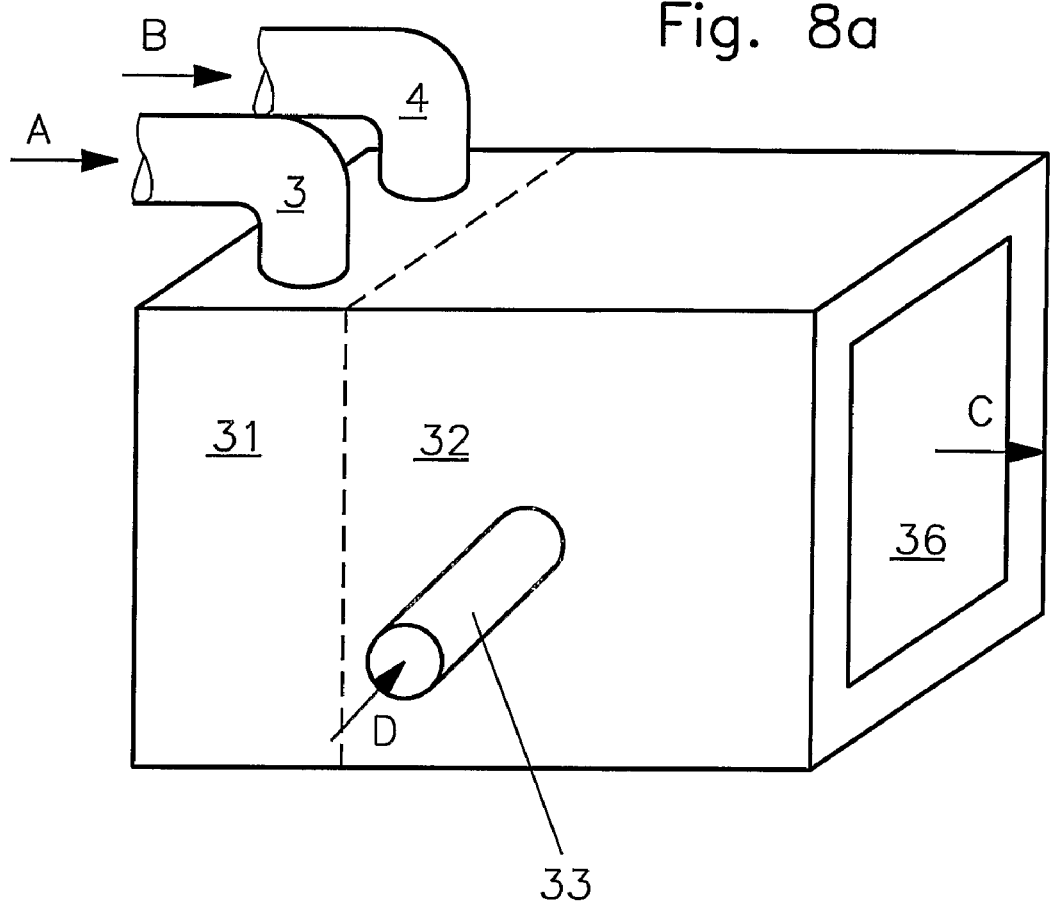

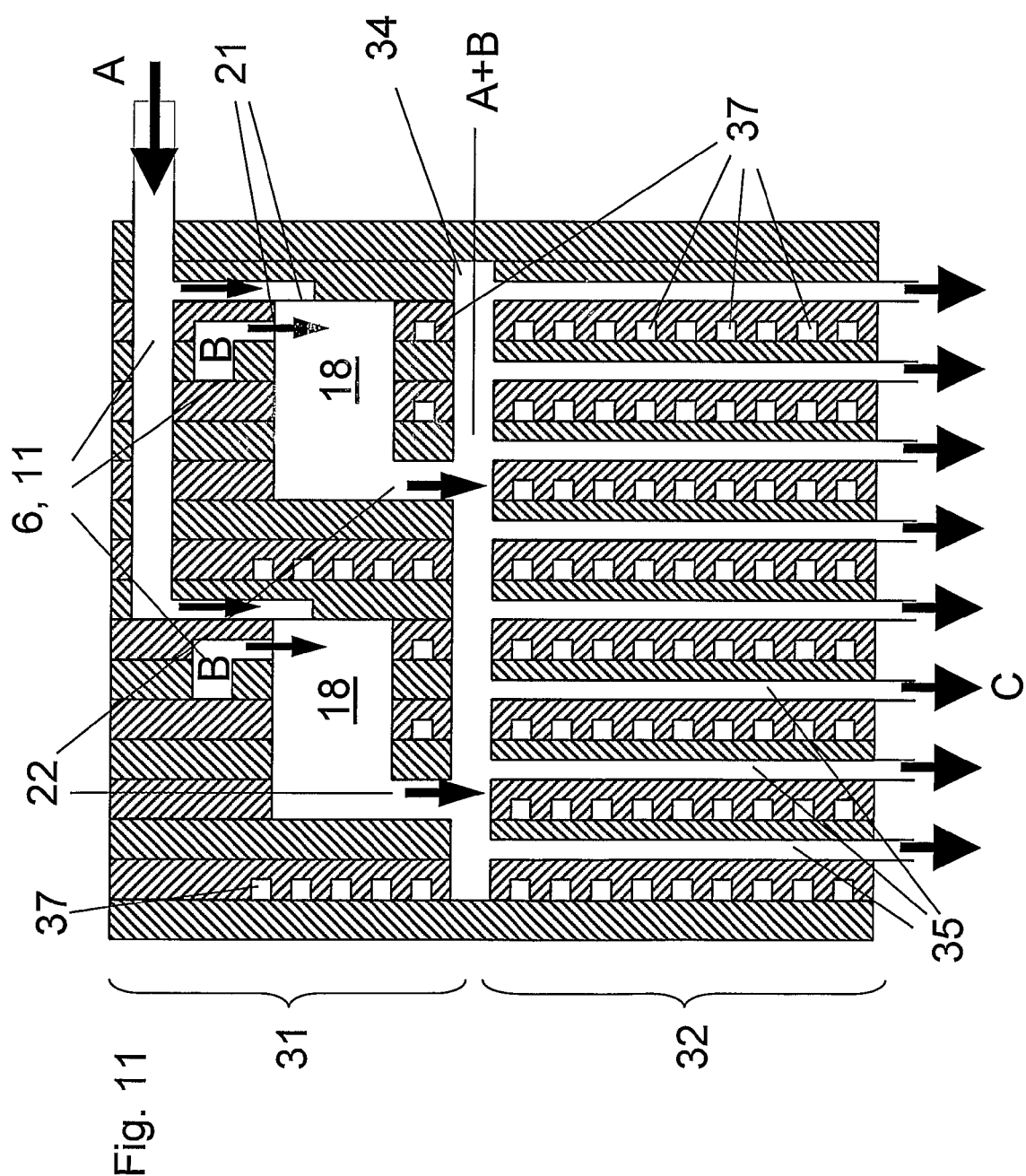

MIXER SYSTEM, REACTOR AND REACTOR SYSTEM

CROSS REFERENCE TO PRIOR APPLICATIONS

This is a U.S. national phase application under 35 U.S.C. §371 of International Patent Application No. PCT/EP2006/002648, filed Mar. 23, 2006, and claims benefit of German Patent Application No. 10 2005 015 433.6, filed Apr. 5, 2005, which is incorporated by reference herein. The International Application was published in German on Oct. 12, 2006 as WO/2006/105870 under PCT Article 21(2).

The present invention relates to a mixer system for mixing at least two fluids. The present invention further relates to a reactor and a reactor system including the above-mentioned mixer system.

BACKGROUND

In mixer systems, fluids to be mixed may be separately divided into a plurality of fluid flow filaments, which all together pass through feeders and flow into mixing chambers via inlets. The so-achieved closely adjacent relationship between individual micro-flow filaments of the two or more fluid fractions enables effective mixing to be obtained over a short distance and in a very short time.

German Patent DE 44 16 343 C2 describes an example of a mixer including a mixing chamber and an upstream guide structure for separately feeding fluids to be mixed to a mixing chamber. The guide structure has dimensions in the millimeter range and is formed by a plurality of stacked foils which each have a thickness of about 100 µm and in which the channels are formed as microstructures. The channels of a foil include feeders for only one of the two fluid fractions. In one embodiment, the mixing chamber opens directly into the microchannels of a downstream heat exchanger or microreactor.

A similar mixer, in which the feed channels for two fluids to be mixed or dispersed extend in curved paths and discharge in parallel into the mixing chamber, but which is otherwise of the same construction and operating principle, is described in DE 195 40 292 C1. This arrangement is expected to allow mixing to occur with the same efficiency and speed over the whole discharge cross-sectional area within the mixing chamber. The guide channels have substantially constant cross sections and widths smaller than 250 µm. The foils into which the channel structures are formed have a thickness of about 100 µm.

German Patent Application DE 101 23 093 A1 also describes a static micromixer for mixing at least two fluids, including a plurality of structured foils stacked on top of one another. However, the mixing chamber is formed by a circular opening in a foil; the inlets of the two fluids being formed on the same foil in such a manner that they are arranged in alternating sequence in one plane over the cylindrical wall of the mixing chamber and over the entire height thereof. During mixing, a two-dimensional helical flow is created in the mixing chamber. This helical flow discharges through a hole provided in one end face of the mixing chamber concentrically with the axis of symmetry thereof, said end face being formed by a foil surface bounding the mixing chamber.

International Patent Application WO 02/089966 A2 A also describes a similar mixing apparatus for mixing at least two fluids, in which the flow is directed along a helical path. However, in that patent, the fluids are additionally mixed in mixers in the feed lines before they enter the mixing chamber.

However, when a flow is directed along a helical path in the manner mentioned above, the flow is constricted as a natural consequence. This flow constriction creates an appreciable resistance to flow, which significantly limits the potential throughput or results in an increasing velocity of flow.

U.S. Pat. No. 5,573,334 also describes a static mixer for two fluid fractions, including a cylindrical mixing chamber having two end portions. One inlet for each fluid fraction and a common outlet are positioned in one of the end portions, respectively. Here too, the outlet is provided in the form of a concentric hole in the bottom of the cylindrical mixing chamber, which always involves the aforementioned effects.

A particularly large mixing contact area between the fluids to be mixed is achieved through miniaturization by dividing the fluids into micro-flow filaments. Thus, mixing does indeed occur rapidly and completely, but at a relatively low fluid throughput. On the other hand, any increase in the dimensions would, in fact, increase the potential fluid throughput, but would be associated with a decrease in the specific mixing contact area between the fluids to be mixed. Practical tests have shown that in the aforementioned mixers, a simple increase in entry channels to a mixing chamber involves the risk that unavoidable manufacturing inaccuracies, plugging, and inhomogeneities of flow in the individual fluid feed channels may result in inhomogeneous introduction of the fluid fractions to be mixed into the mixing chamber.

If a mixer system of the type mentioned above is to be used to produce a reactive fluid mixture which, after mixing, is to be introduced into a reactor volume for subsequent chemical reaction, instantaneous and yet homogeneous mixing is of particular importance. To this end, it is important that the homogeneous mixture be transferred into the reaction volume for subsequent, controlled chemical reaction in a very short time, namely before backmixing may occur, or before a premature start of the reaction.

SUMMARY

It is an aspect of the present invention to provide a mixer system which has an improved mixing efficiency and, at the same time, provides increased fluid throughput at equal or lower pressure drops. A further aspect is to provide a reactor and a reactor system which use the aforementioned mixer system and which, on the one hand, are compact in design and, on the other hand, provide increased throughput and a low pressure drop for fluids and reaction products passing therethrough, while allowing the occurring reaction to be controlled to a great extent.

In an embodiment, the present invention provides a mixer system for mixing at least two fluids. The mixer system includes a guide matrix, a plurality of micromixers and feed lines for the fluids to be mixed. The micromixers are fluidically connected in parallel and integrated into the guide matrix. The micromixers are fluidically connected in the guide matrix via the feed lines.

In another embodiment, the present invention provides a reactor that includes a mixer system for mixing at least two fluids, at least one reactor volume and an arrangement configured to adjust the residence time of a fluid between outlets of the mixer system and reactor volume. The mixer system includes a guide matrix, a plurality of micromixers, and feed lines for the fluids to be mixed. The micromixers are fluidically connected in parallel and integrated into the guide matrix. The micromixers are fluidically connected in the guide matrix via the feed lines. The micromixers each include a mixing chamber having feeders for at least two fluids to be mixed or dispersed. The feeders each have at least one inlet to the mixing chamber. Each mixing chamber has at least one outlet. The inlets of the fluids are arranged in alternating sequence in at least one plane. The mixing chambers are configured to be rotationally symmetrical with respect to an axis of symmetry and to have two end portions. The outlets and inlets are positioned in one of the end portions, respectively. The at least one reactor volume is connected to the outlets of the mixer system.

In yet another embodiment, the present invention provides a reactor system that includes at least two reactors fluidically connected in series. Each reactor includes a mixer system for mixing at least two fluids, at least one reactor volume and an arrangement configured to adjust the residence time of a fluid between outlets of the mixer system and reactor volume. The mixer system includes a guide matrix, a plurality of micromixers, and feed lines for the fluids to be mixed. The micromixers are fluidically connected in parallel and integrated into the guide matrix. The micromixers are fluidically connected in the guide matrix via the feed lines. The micromixers each include a mixing chamber having feeders for at least two fluids to be mixed or dispersed. The feeders each have at least one inlet to the mixing chamber. Each mixing chamber has at least one outlet. The inlets of the fluids are arranged in alternating sequence in at least one plane. The mixing chambers are configured to be rotationally symmetrical with respect to an axis of symmetry and to have two end portions. The outlets and inlets are positioned in one of the end portions, respectively. The at least one reactor volume is connected to the outlets of the mixer system. The reactor volume of one reactor is connected to one of the feeders of the other reactor.

BRIEF DESCRIPTION OF THE DRAWINGS

Aspects of the present invention will now be described by way of exemplary embodiments with reference to the following drawings, in which:

FIGS. 2a through c are schematic cross-sectional views of three embodiments of the mixer system;

FIG. 11 is a cross-sectional view of a reactor which is in the form of a composite foil structure and in which the outlet areas from the mixing chambers are cooled.

DETAILED DESCRIPTION

Figure 1B:
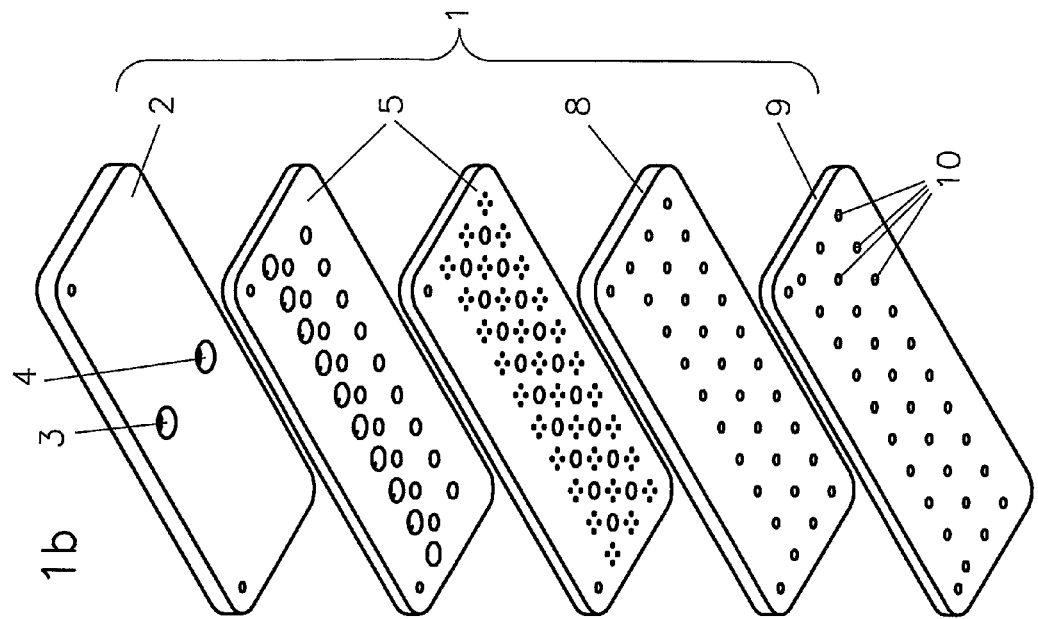
FIGS. 1a and b are in exploded views from two perspectives of an embodiment of the mixer system which is made up as a composite foil or plate structure.

According to an embodiment of the present invention, a mixer system for mixing at least two fluids includes a plurality of substantially identical micromixers which are fluidically connected in parallel, integrated into a guide matrix and fluidically connected therein via feed lines for the fluids to be mixed. The risk of backmixing is reduced by subdivision into several mixing chambers which, when compared to a single mixing chamber, always have a larger specific wall surface area, which can be made use of for adjusting the temperature immediately during and after the mixing of the fluid mixture. Before the fluids are introduced into the mixing chambers of the micromixers, they are divided into a multiplicity of microflow filaments on a fraction-by-fraction basis, and then introduced into the mixing chambers of the micromixers, preferably in alternating sequence with respect to the fluid fractions.

The specific contact areas achieved between the different fluid fractions become increasingly large with decreasing cross-sectional dimensions of the individual fluid flow filaments, which significantly speeds up the mixing of the individual fluid fractions.

Thus, advantageously, the above-mentioned micromixers ensure that the fluids are mixed completely and particularly rapidly, and thus efficiently, while at the same time being small in size. In addition, throughput is increased by connecting a plurality of micromixers in parallel.

Conveniently, the at least two fluid fractions to be mixed are each introduced into the mixer system through a single supply conduit, respectively, and distributed to the individual, preferably identical micromixers through feed lines provided in a guide matrix in the mixer system. In particular, the feed lines in the guide matrix may be designed such that identical flow and pressure conditions will exist in the supplied fluids at the entry to each of the micromixers. This may preferably be achieved by maximally enlarging the cross-sectional area of the feed lines between the connection ports and the micromixers, whereby advantageously both the fluid velocity and the fluid resistance are reduced locally, which provides identical fluid conditions at all micromixers.

The present invention also includes embodiments in the form of a fluid-permeable mixer system which allows fluid passage in one direction and is inserted between two fluid volumes or two reaction volumes, such as a planar partition wall or barrier between the two volumes, or other admixing system. In the process, the flow passes through the system in that it is introduced, also through a plurality of connection ports (for example, per micromixer), into the micromixers, where it is mixed with a second substance, such as a chemical. The substance to be admixed is conducted through distribution channel structures (feed lines) to the micromixers. The micromixers may be distributed over the entire system (for example, the partition wall). An upstream filter, such as a filter foil lying flat against the partition wall on the upstream side thereof, prevents entry of contamination, and thus, plugging of individual micromixers. This design allows even larger cross-sectional flow areas to be homogenously doped with substances without causing unwanted overconcentrations to occur temporarily and locally in the fluid volume on the downstream side.

The mixer system performs optimally if all micromixers integrated therein and connected in parallel produce the same mixing result. Manufacturing inaccuracies or plugging directly change the cross-sectional area of especially the micro-flow filaments prior to entry into the mixing chambers, thus directly changing the fluid mixing ratio in the particular affected micromixers.

In an embodiment, the mixer system has a modular design to ensure a constant mixing ratio in all micromixers. In this manner, each individual module can not only be tested and classified (for example, by mixing efficiency or pressure drop) during the manufacturing process or during subsequent quality control (such as visual inspection or functional testing), but may also be separately checked and replaced, if necessary, after disassembly during a maintenance inspection of the mixer system. Preferably, the individual micromixers are each designed as separate and identical modules, and provided as replaceable inserts in the guide matrix in a form-fitting manner.

The guide matrix, in turn, contains, for each fluid, separate distribution structures (such as feed lines in the guide matrix), which ensure equal pressure conditions at the feeders to each micromixer. Preferably, these distribution structures contain the aforementioned continuous, enlarged volume immediately upstream of all feed lines to the mixing chambers in the micromixers. Such an enlargement of the cross-sectional flow area of the feed lines, but in principle also of the areas adjacent to and fluidically downstream of the outlets of the micromixers, causes the aforementioned decrease in the flow velocity, and thus in the flow resistance, whereby advantageously the same pressure conditions will exist in all preferably identical micromixers.

When implementing the aforementioned designs, it is advantageous for the micromixers to be inserted as separate inserts into the guide matrix of the mixer system in a form-fitting manner, the feed and discharge lines for the fluids and fluid mixtures penetrating the outer surfaces in various regions of the inserts and in such a manner that they are sealed from each other. Due to the size of the micromixers, it is advantageous for the inserts to be configured in the shape of a cylinder having a lateral surface and two end surfaces, the feed lines for the fluids penetrating the lateral surface and/or one of the two end surfaces, and at least one outlet penetrating the respective other end surface or the lateral surface. The form-fit of these inserts in the guide matrix alone ensures the aforementioned sealing fluid connection, it being possible to optimize this effect by suitable pairing of materials (for example, by forming the guide matrix, the insert, or a separate intermediate layer from a sealing material such as PTFE).

All micromixers and the inserts are preferably identical in design and dimensions. Advantageously, they can also be checked individually and empirically in mixer tests (for example, in a special testing device), and may be classified by certain characteristics, such as mixer efficiency or flow resistance, etc., according to the result. In this manner, it can be ensured, for example, that all micromixer inserts which are inserted into a guide matrix are not only geometrically, but also functionally identical within a definable tolerance. In the present case, identical inserts have further advantages, which are achieved for micromixer inserts on the basis of standardized (mass) production, and with respect to warehousing (small number of different parts).

Also proposed is a reactor, in which the aforementioned mixer system is disposed upstream of at least one reactor volume. In particular, a plurality of reactor volumes may be connected in series and/or in parallel. In a reactor system, additional micromixers of the type described above may be interposed between two or more reaction volumes in order to admix another fluid or to homogenize the reaction products. In that case, individual or all feed lines of the mixer systems are connected directly to the outlets of the reactor volume. The use of the micromixers connected in parallel alone advantageously allows the residence times of a uniformly mixed homogeneous fluid mixture between the outlets of the mixer system and the inlet to the reactor volume to be effectively adjusted (for example, limited to a maximum value and/or to a minimum value, even for larger mass flows.

Further means for adjusting this residence time are preferably provided in the form of flow-optimized displacers between the outlet and the reactor volume, said displacers exactly adjusting the volume available for the residence time, thus transferring the fluid mixture directly into the reactor volume. This not only reduces the possibility of backmixing or segregation in the fluid mixture, but also restricts unwanted reactions prior to introduction into the reactor volume. In particular in the case of rapidly reacting fluid mixtures, it is suitable to adjust the temperature in the area surrounding the displacers (for example, by means of temperature-adjusting media, such as coolants in microchannels), to configure this area favorably in terms of fluid dynamics (by means of fluid-guiding means), or to influence this area by means of catalytic materials (to suppress or speed up certain chemical reactions, even selectively).

FIGS. 1$a$ and $b$ illustrate a first embodiment of a mixer system including a composite foil structure 1 (or a plate structure) as a guide matrix, shown in exploded views from two perspectives. Composite foil structure 1 includes, in the following order, a cover foil 2 having a connection port 3 and a connection port 4 for the fluids A and B, respectively, two supply foils 5 having three-dimensional supply structures 6 leading from the connection ports to micromixers 7 provided on mixer foil 8, and further includes a discharge foil 9 provided with outlets 10. All foils (or plates) can be individually visually inspected during a quality control check prior to assembly. The above-mentioned foils or plates are manufactured from a material that is resistant to the fluids and the reaction and mixture products, and are joined together (for example, by bonding with an adhesive that is resistant to chemical and physical attack, by diffusion welding, or by a press-fit in the housing) before they are fitted into a housing. Since not all of the above-mentioned foils (or plates) come into contact with all fluids and products therefrom, it is also possible to use different foil materials in a mixer system. Suitable materials include in particular chromium nickel steels, chemically resistant plastics or glasses which can be very finely structured, either mechanically (by chip-removing machining or embossing), electroerosively or chemically (by etching).

It is explicitly noted that the above-mentioned foils and composite foil structures (foil stacks) according to an embodiment of the present invention also include plates or metal sheets, or composite structures formed by plates or metal sheets, as well as other planarly extending components or composite component structures, even if not explicitly mentioned in the application.

During assembly of the system, it is convenient to first assemble only mixer foil 8 and the adjacent foils to form a composite foil sub-structure, in order to allow the micromixers 7, which are made functional in this way, to be individually tested on the composite foil sub-structure during a quality control check, which is a not-to-be underestimated advantage of this construction. However, in the event of a defective micromixer, the entire composite foil sub-structure may possibly be unusable. Further, the composite foil sub-structure tested in this manner may be completed step-by-step by iteratively adding further foils, it being possible to perform a partial empirical test (either automatically or manually) after each sub-step. It is a feature of this embodiment that a large number of micromixers may be integrated into the guide matrix in a particularly close spatial relationship with one another, and without increasing the complexity of manufacture if the foils are structured in parallel, for example, chemically (by etching).

Figure 2A:
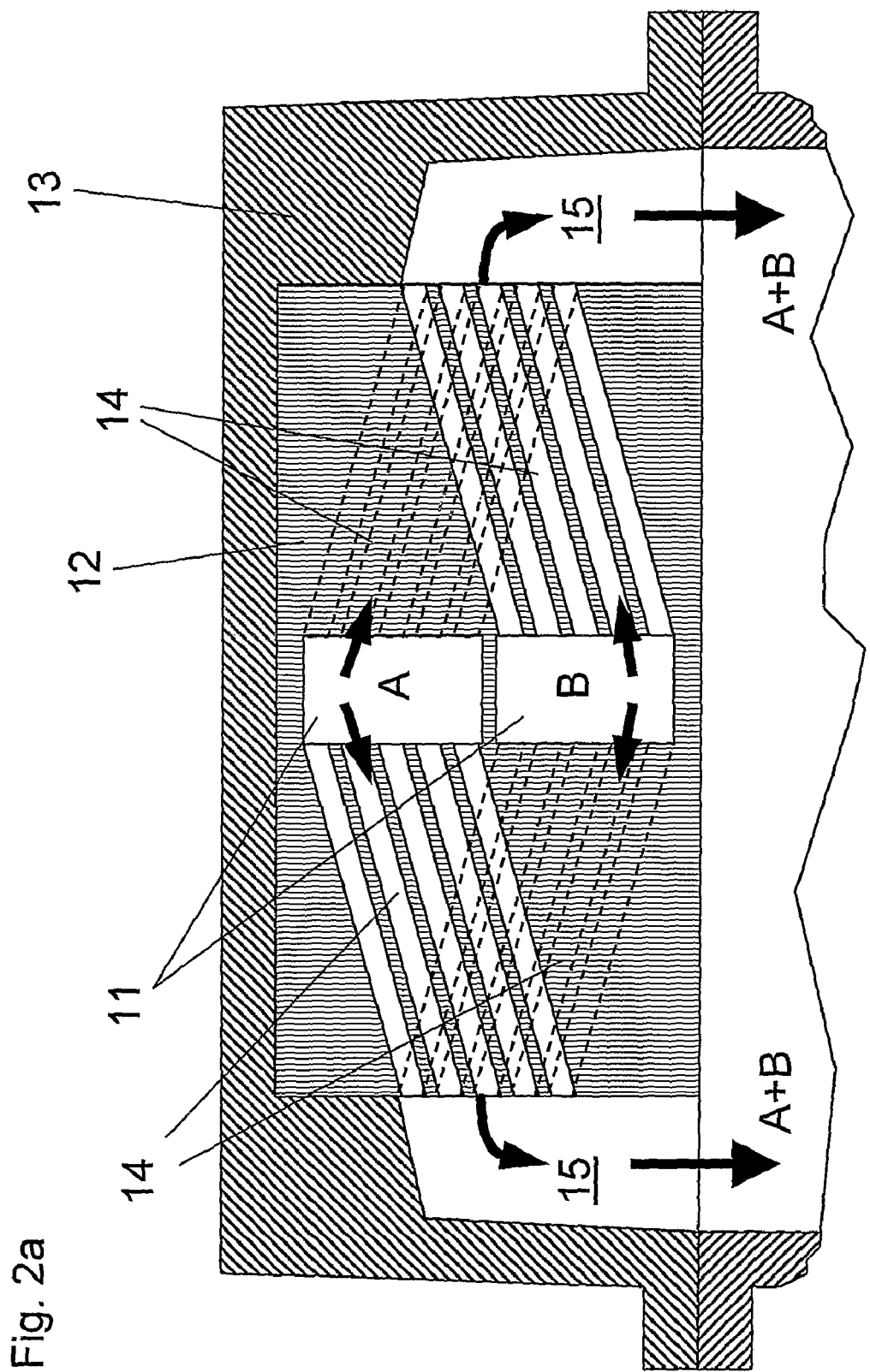
Figure 2B:
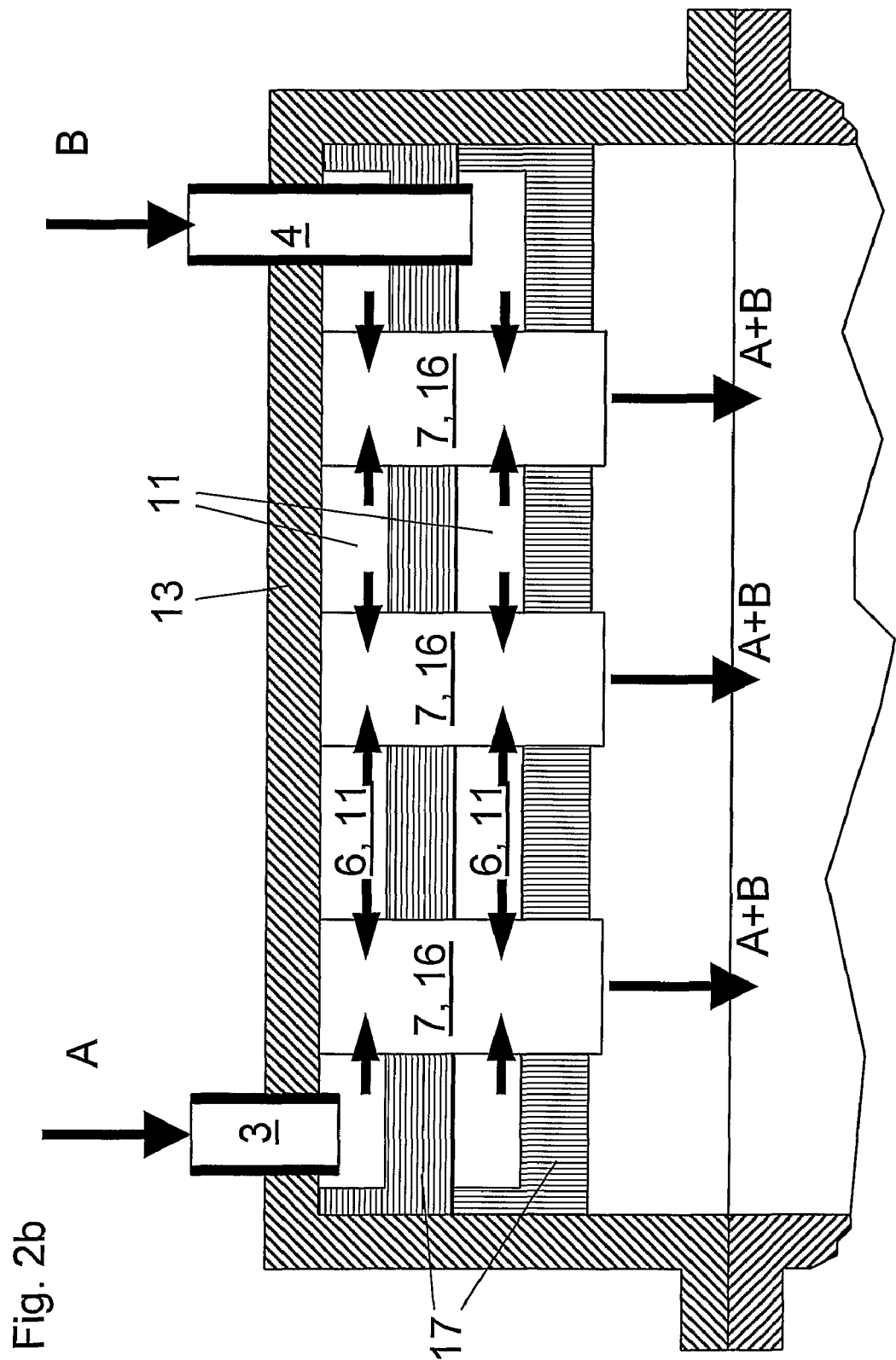

FIGS. 2a through c disclose alternative embodiments of the mixer system. In all three figures, the flow directions of fluids A and B, and of fluid mixture A+B, are indicated by arrows.

FIG. 2a shows an embodiment having two feed lines 11 for fluids A and B arranged in guide structure 12 in a housing 13, said feed lines being oriented orthogonally to the planes of section. A multiplicity of microchannels lead from these feed lines on both sides thereof and in a V-shaped manner to two mixing chambers 15 which are located on both sides of the guide structure and in which the fluid mixtures A+B are mixed (two micromixers). Preferably, the guide structure is a composite foil structure, the individual foils being arranged parallel to the plane of section and alternately containing the microchannels for one fluid fraction per side, respectively. An optional division of the guide structure in the middle thereof would allow the micromixers to be replaced for each side separately. In the example shown, microchannels 14 are straight in shape. However, all of these microchannels may also be in the form of curved channels or differently shaped (for example, funnel-shaped) channels.

On the other hand, FIGS. 2b and c show embodiments having individually replaceable, preferably cylindrical micromixer inserts 16 which are inserted into form-fitting openings in a guide matrix which is formed of stacked foils 17 (or plates) in housing 13, and further having connection ports 3 and 4 for fluids A and B, respectively. The foils each have formed therein supply structures 6 including feed lines 11; i.e., channel structures between the connection ports and the micromixer inserts. Depending on the specific embodiment, the micromixer inserts are inserted into the guide matrix from below (FIG. 2b) or from above (FIG. 2c). Moreover, particularly in the variant shown in FIG. 2b, the inserts are reliably secured in the guide matrix by a suitable arrangement (for example, a retaining screen, a press-fit, etc.).

Figure 3A:
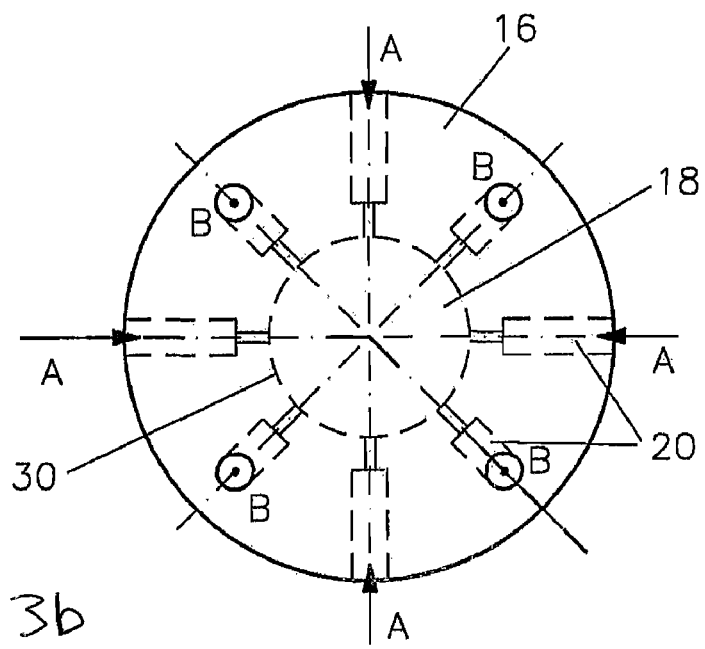
FIGS. 3a through e are cross-sectional views showing the micromixers as cylindrical inserts, which may be used in the embodiments shown in FIGS. 2b and c.
Figure 3B:
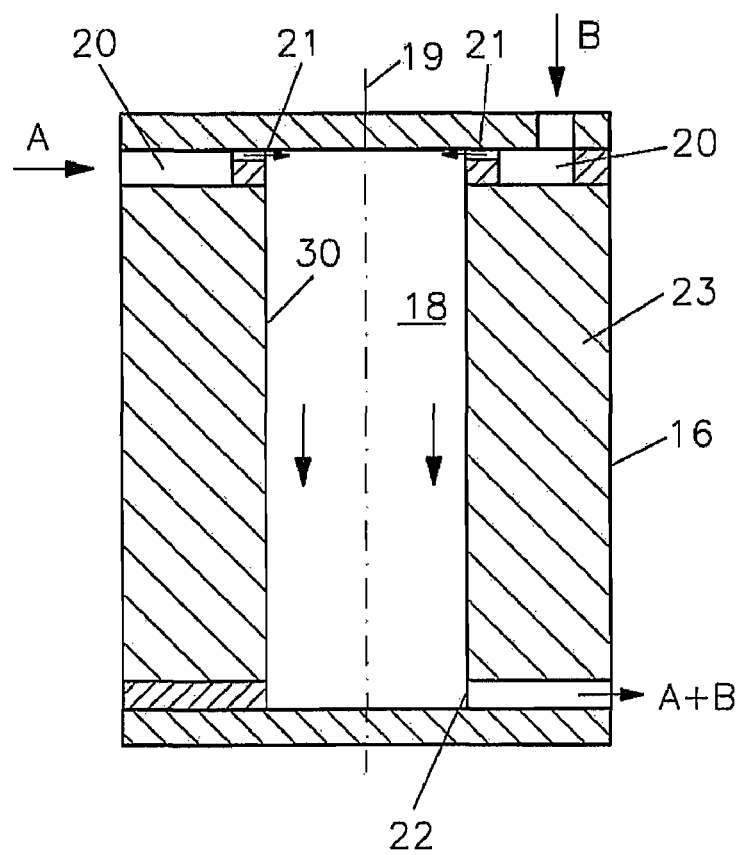
Figure 3C:
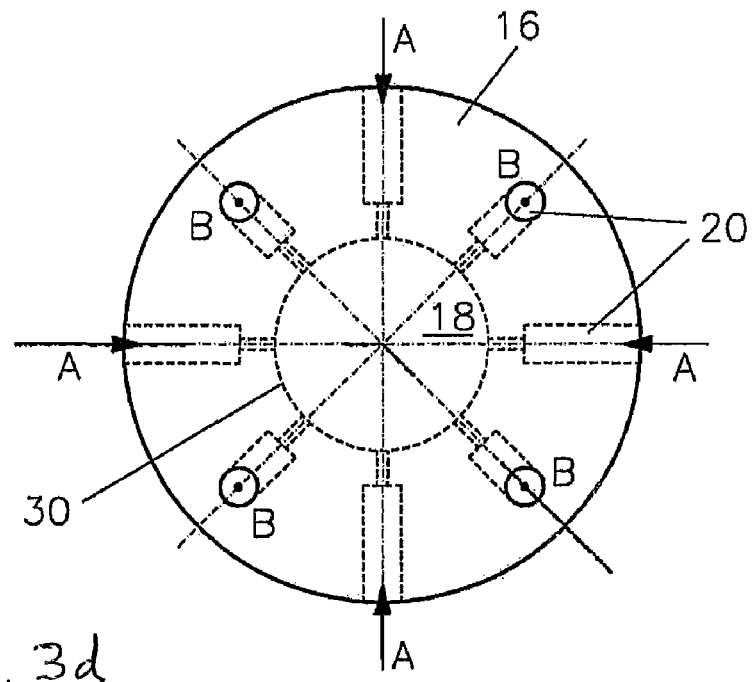
Figure 3D:
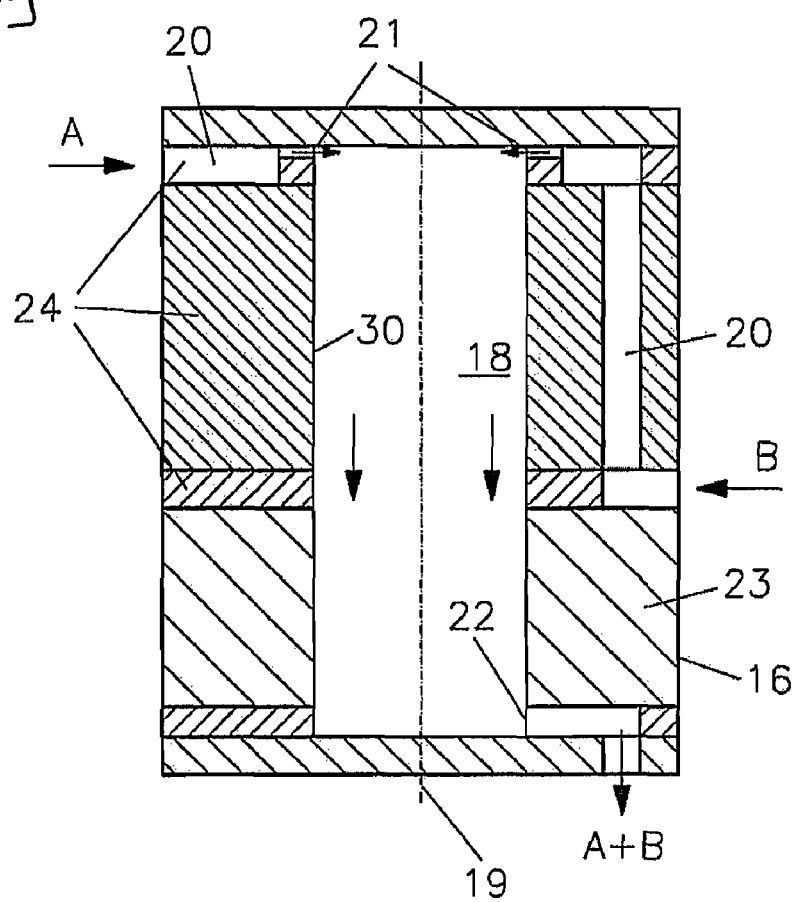
Figure 3E:
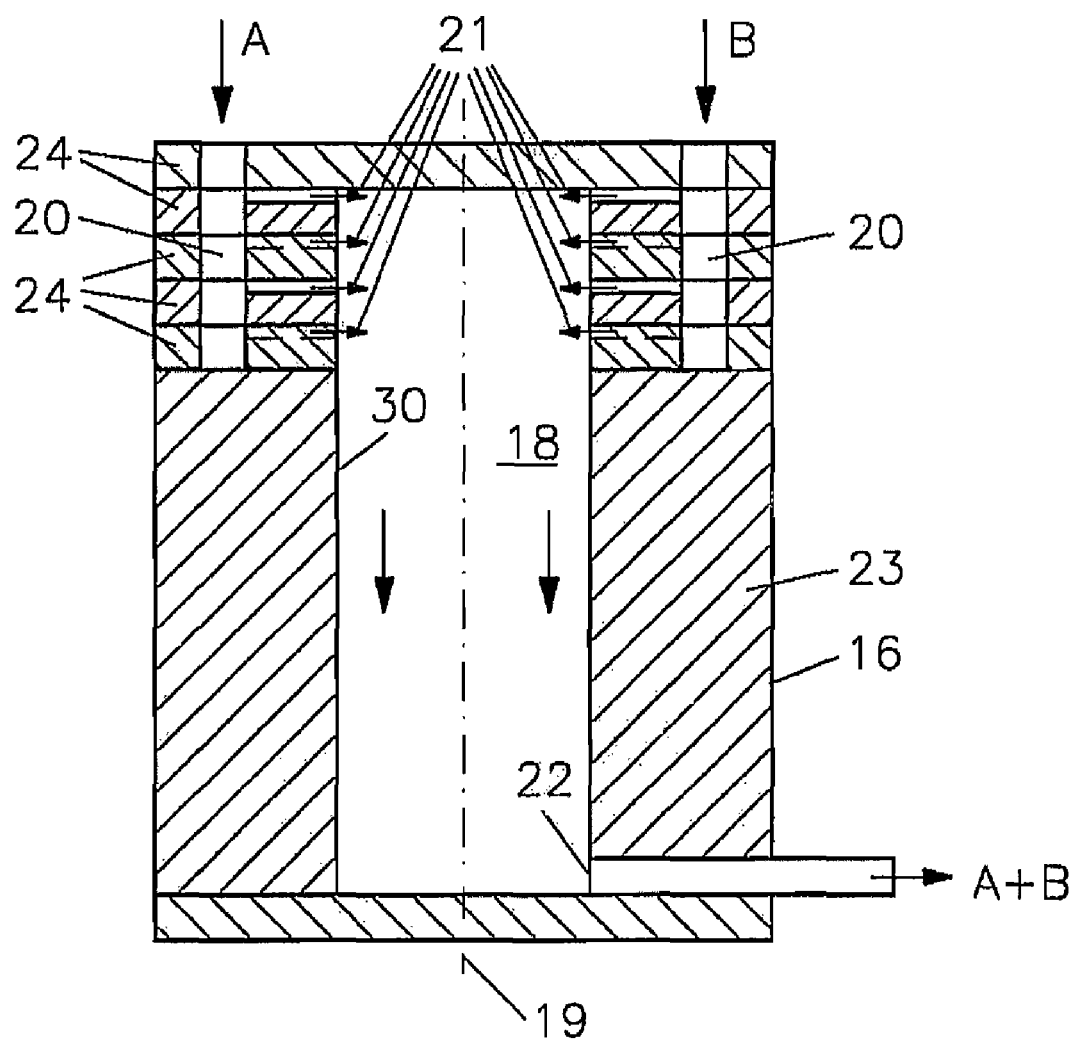

The aforementioned micromixer inserts each contain one mixing chamber having feeders for fluids A and B, and outlets for fluid mixture A+B. These penetrate a defined region of the lateral surface and/or the end surfaces of the micromixers, respectively, (see the arrows in FIGS. 2b and c). Also shown in FIG. 2c, by way of example, are tangential outlets from the mixing chamber (see also FIGS. 3a, b and e), which open into channel structures extending in the adjacent foils and in discharge foil 9 (which at the same time provides a stop for the micromixer inserts), the channel structures optionally varying in cross-section.

Figure 1A:
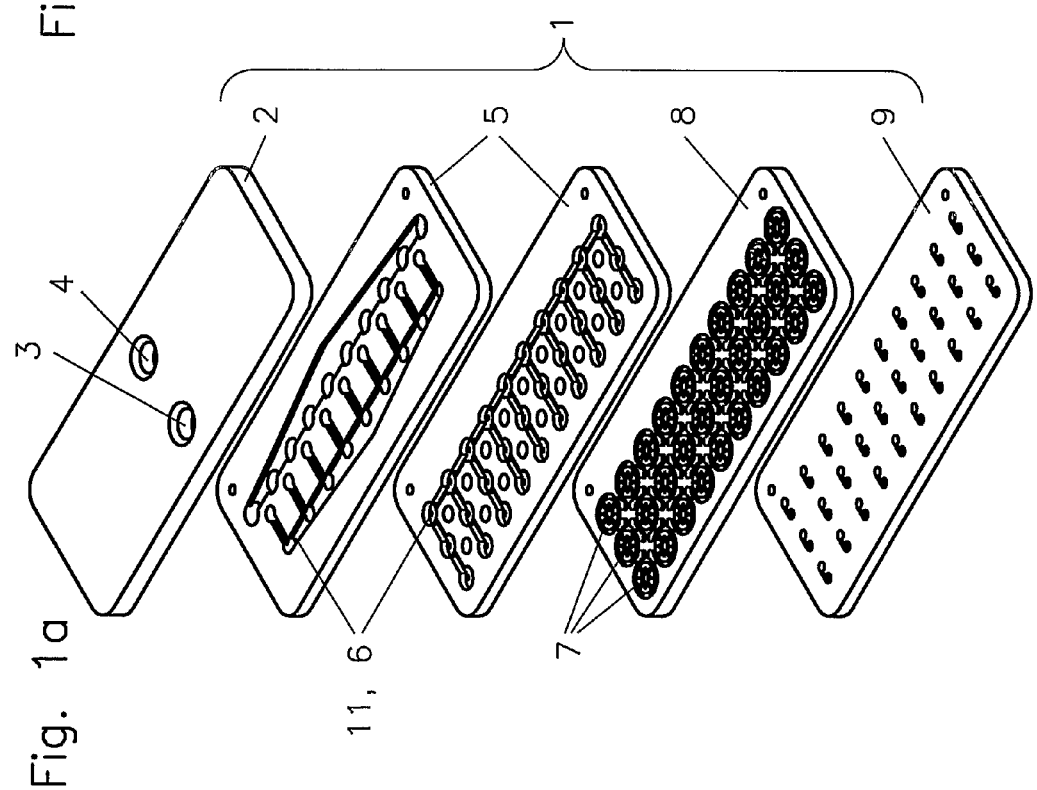

The micromixer inserts, illustrated in different embodiments in FIGS. 3a through e in detail, and also the micromixers according to the embodiment shown in FIGS. 1a and b, each preferably have one rotationally symmetrical mixing chamber 18 having an axis of symmetry 19 and two end portions, a number of feeders 20 for two or more fluids (A and B) to be mixed or dispersed, said feeders each having at least one inlet 21 to the mixing chamber, and the mixing chamber further having at least one outlet 22. All inlets 21 are located exclusively in one of the two end portions, while outlets 22 are positioned in the other end portion. Preferably, the inlets of the fluid fractions are distributed over the periphery of the lateral surface of mixing chamber 18; i.e., not arranged on the end surface, in alternating sequence in one or more planes. The micromixers shown are or include axial composite layer structures. However, other types of construction, such as structured tubes concentrically arranged one within the other, are also possible.

One embodiment of these micromixers includes an array of fluid fraction inlets to the mixing chamber. More specifically, the inlets are arranged in alternating sequence. Thus, the alternating sequence of inlets, and thus of the fluid flow filaments entering the mixing chamber, provides a large specific mixing contact area between the fluid fractions to be mixed or dispersed in the mixing chamber. If the inlets are arranged in several planes and if, in addition, the inlets in one plane are offset with respect to those in the respective adjacent plane, the fluid flow filaments of one fluid fraction are surrounded to a substantial extent, preferably completely, by fluid flow filaments of the respective fluid fraction.

An important feature of the aforementioned micromixer inserts is that the outlet is disposed non-concentrically in the mixing chamber. Preferably, the outlets are disposed in the outer region of the mixing chamber, preferably in the lateral surface. Therefore, the aforementioned centrifugal forces which counteract the flow and which must be overcome by the fluid mixture are not as strong as those expected in known systems. Furthermore, a back pressure, which is created in rotationally symmetrical mixing chambers of known systems and promotes turbulent mixing, is deliberately reduced here. As a matter of fact, in accordance with an aspect of the present invention, there is no need for any back pressure, because the mixing takes place in the manner described above and to a sufficient degree in the region of the laminar fluid flow filaments.

Turbulent flow components typically improve the efficiency of mixing or dispersion of the fluid flow filaments in the mixing chamber. However, they result in greater differences in the residence times of the fluid mixtures in the mixing chamber. In certain mixing processes, especially in reactive mixing processes, it is imperative to avoid such differences in residence time. By avoiding or reducing turbulent flow, the aforementioned differences in residence time are also advantageously reduced, especially as compared to the devices of known systems.

If the inlets of one plane are offset by one inlet with respect to those in the respective adjacent plane, the fluid flow filaments entering the mixing chamber will be embedded in one or more other fluid fractions, respectively. Ideally, each of the fluid flow filaments is bordered completely, i.e., on all sides, by fluid flow filaments of another fluid fraction, which makes it possible to achieve optimal specific mixing contact area between the fluid fractions, and thus to further improve the mixing efficiency. The array of the individual inlet cross-sections obtained during mixing or dispersion of two fluid fractions is ideally similar to that of a checkerboard.

The orientation of the inlets with respect to the mixing chamber wall; i.e., the inflow angle of the fluid flow filaments is selected to be between 0° (parallel to the mixing chamber wall) and 90° (orthogonal to the mixing chamber wall), preferably to promote parallel laminar flow toward the outlet or outlets. Preferably, in order to create a preferred, helical fluid flow path in the mixing chamber, the inlets are preferably disposed tangentially at a slight sloping angle with respect to the wall provided by the lateral surface of the mixing chamber.

From a constructional point of view, an object of the present invention is achieved by the planes being in the form of foils which are provided with grooves as fluid-guiding means, the feeders provided per fluid fraction being fluidically interconnected via fluid channels including openings formed one above the other in the foils. The openings located one above the other in the foil stack provide the fluid channels from which the fluid-guiding means branch toward the mixing chamber. The fluid connections to the fluid channels are preferably provided on the respective outer, bounding cover foil. Alternatively, supply may also be via channels on one or more foils, in which case the fluid channels are sealingly covered by the respective outer, bounding cover foils.

The aforementioned slight sloping angle of the inlets can be achieved, for example, by configuring the foils in the form of the lateral surface of a truncated cone, either entirely or only in the region of the inlets, i.e., directly at the wall of the mixing chamber. This can be accomplished by cold-forming the individual foils or the foil stack before the foils are joined together, for example by diffusion welding, to form the guide structure.

Further, it is convenient to provide the fluid channels with suitable measuring means, such as a thermocouple, or means for temperature adjustment or pressure measurement, such as a heating element or a fluidic heat exchanger, and to suitably dimension the fluid channels, thereby advantageously allowing the fluid fractions to be individually conditioned immediately prior to entry into the fluid-guiding means.

Figure 4A:
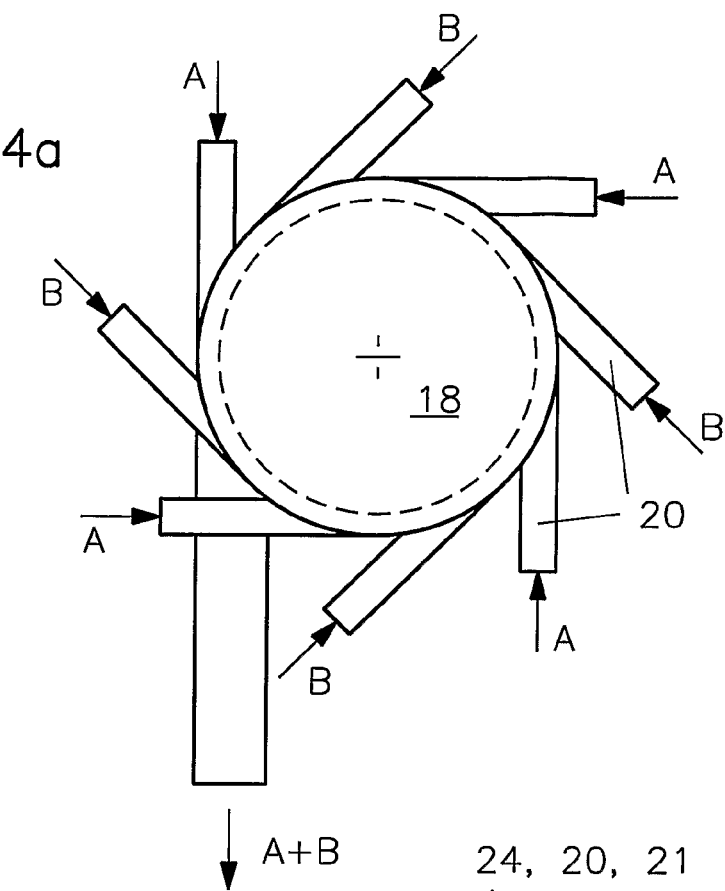
FIGS. 4a and b are schematic side and top views of the basic components of a micromixer.

The basic design of the aforementioned embodiment of a micromixer is schematically shown in FIGS. 4a and b for the mixing of two fluid fractions A and B. This design includes a cylindrical mixing chamber 18 located in a mixing chamber housing 23. Also shown is the basic arrangement of guide structure 24 including feeders 20 and inlets 21 at the upper end, and outlet 22 at the lower end of mixing chamber housing 23. The feeders and inlets are distributed over the periphery of the lateral surface of one mixing chamber end in one plane, and, to be more precise, in alternating sequence with respect to the fluids A and B. Guide structure 24 is sealingly placed, adhesively bonded or welded onto a mixing chamber housing 23. Preferably, the axis of symmetry is oriented orthogonally to the planes formed by the foils.

Figure 4B:
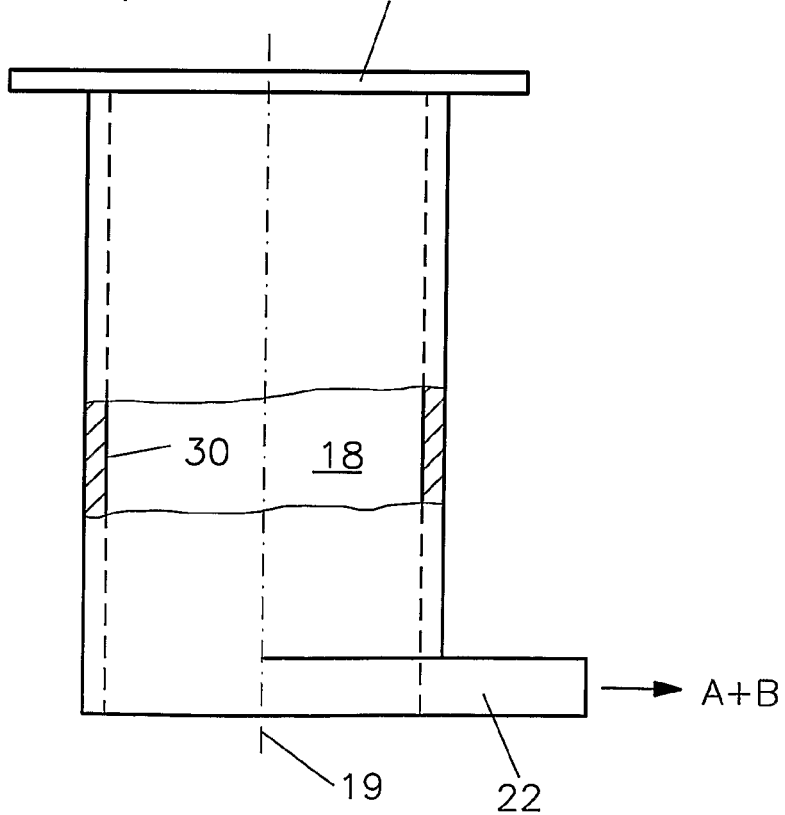
Figure 5:
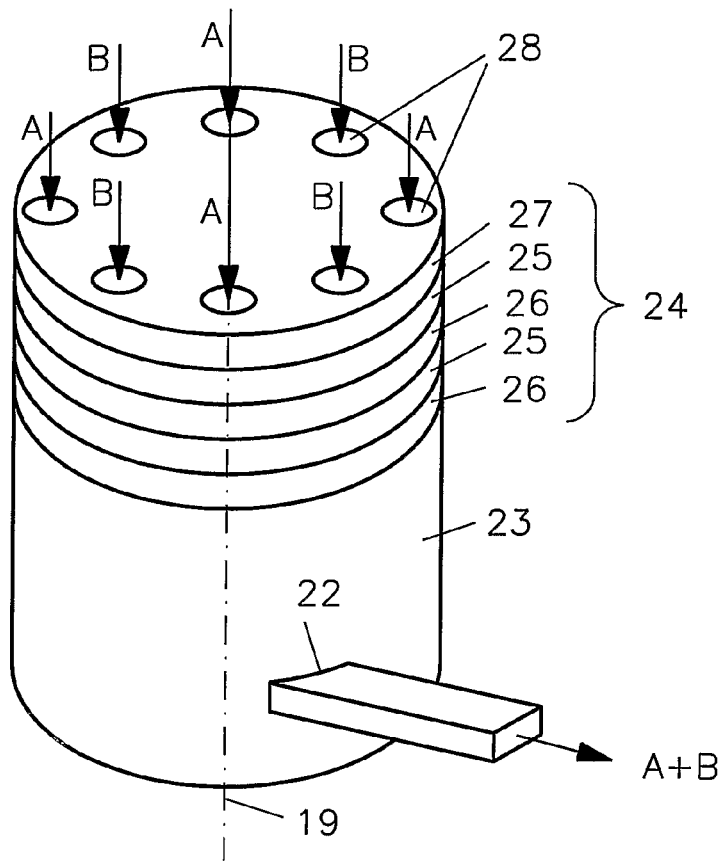
FIG. 5 is a perspective view showing a micromixer having a layered construction.
Figure 6:
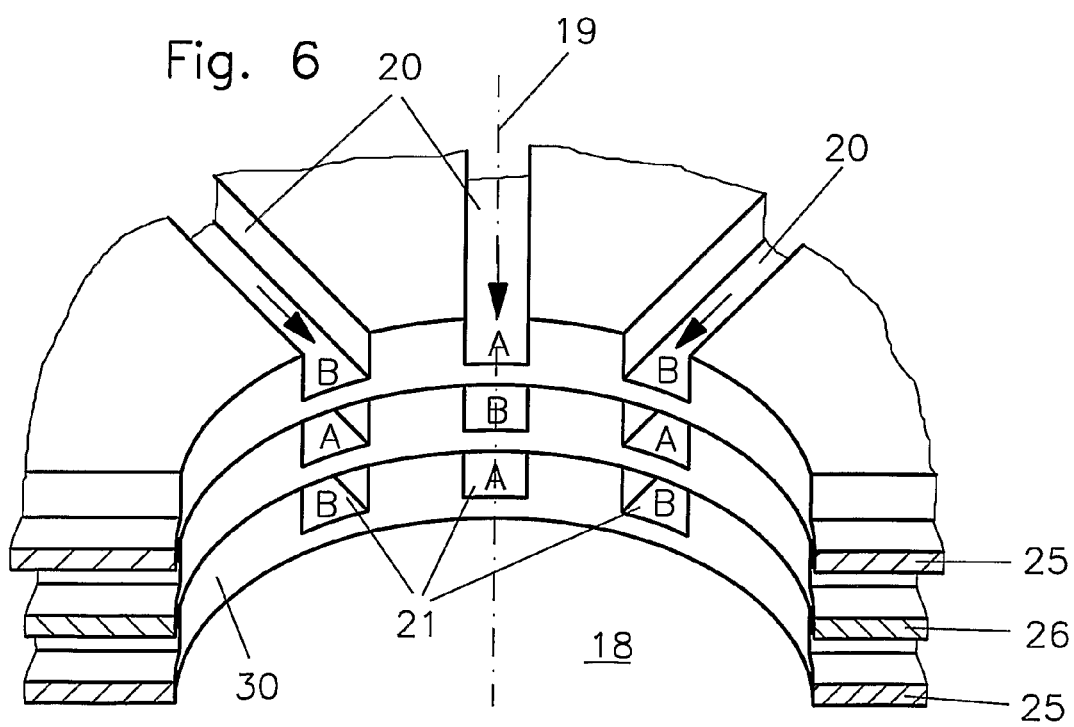
FIG. 6 is a perspective detail view showing the inlets to, and the cylindrical wall of, the mixing chamber of a micromixer according to FIG. 5.

An alternative embodiment of the micromixer is illustrated in FIGS. 5 through 7. The difference between this embodiment and the first embodiment shown in FIG. 4 lies essentially in that the inlets and feeders are arranged in several planes. Both embodiments feature a preferably cylindrical mixing chamber 18 which has two end portions and which is rotationally symmetrical about an axis of symmetry 19.

Both aforementioned embodiments are basically similar in design. This design is described in more detail below with reference to the second embodiment (see also FIGS. 5 through 7). These embodiments include a guide structure 24, preferably made up of a number of alternately stacked foils 25 and 26 (first foil 25 and second foil 26) which are joined together in a gas- and pressure-tight manner (for example, using a diffusion welding process) and which are disposed between a cover foil 27 serving as a mixing chamber cap (mixing chamber end) and a mixing chamber housing 23. Each plane is formed by one of the foils 25 or 26; that is, the first embodiment includes only one foil 25 or 26. Feeders 20 and inlets 21 are formed as channel structures on foils 25 and 26 (preferably by chip-removing machining, electroerosively or chemically by etching). The cover foils are provided with connection openings 28 for the aforementioned fluid connections. The connection openings connect to the aforementioned fluid channels in the guide structure, said fluid channels being formed by a number of openings 29 which are located one above the other in coincident relationship in the foils within the foil stack (see also FIG. 7). Fluids A and B are introduced into the fluid channels through these connection openings (which is indicated in FIG. 5 by arrows on cover foil 27), and from there into feeders 20 to then exit the guide structure and enter the mixing chamber via inlets 21. The surface of guide structure 24 in the region of inlets 21 forms the even wall 30 of the mixing chamber.

Figure 7A:
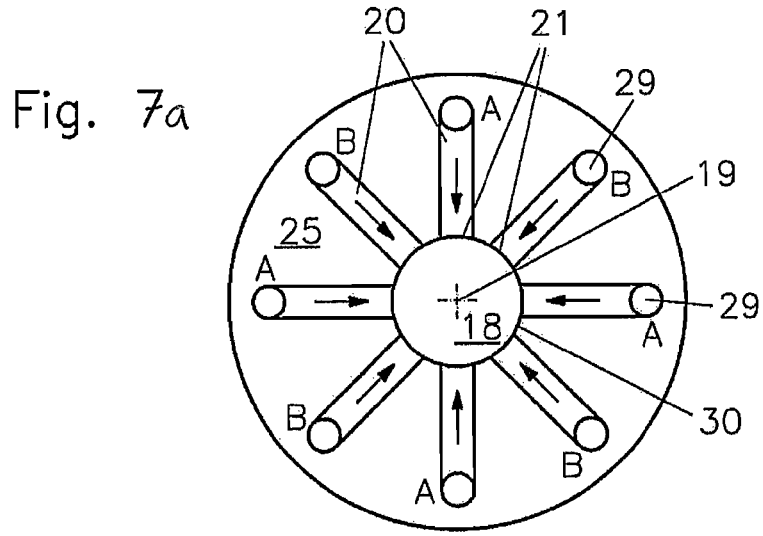
FIGS. 7a through c show top views of several foils of a micromixer according to FIGS. 5 and 6.
Figure 7B:
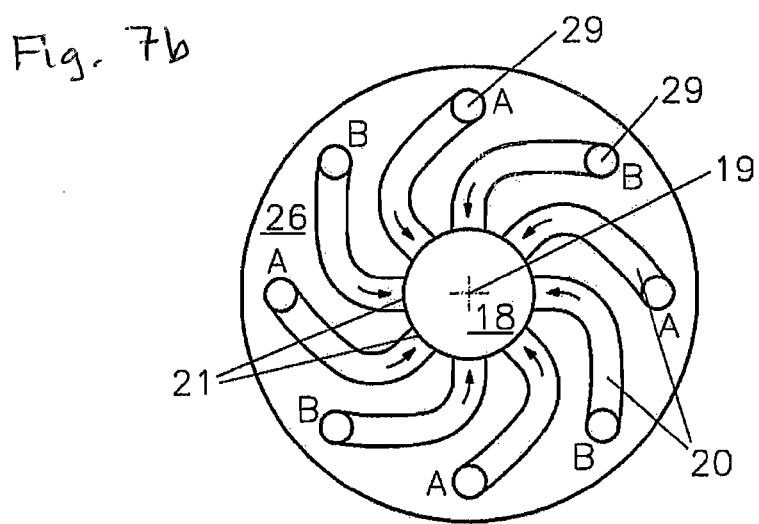
Figure 7C:
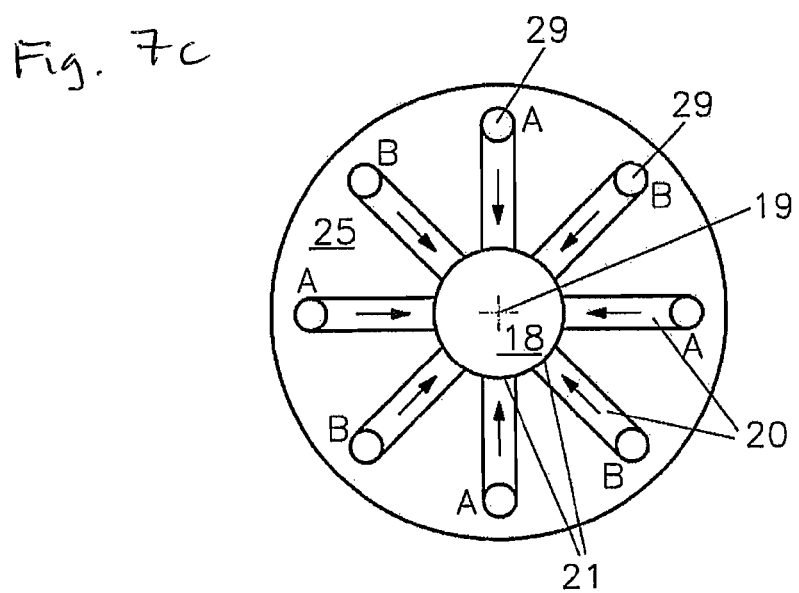

FIGS. 7a through c show in detail foils 25 and 26, including the openings 29 and the channel structures, including feeders 20 and inlets 21 in the area of wall 30. In accordance with this embodiment, only one feeder 20 branches from opening 29 in each foil, the openings providing the fluid channels for fluids A and B in alternating sequence. Thus, each foil forms one plane having inlets of fluids A and B in alternating sequence. On the other hand, the channel structures of foils 25 and 26 are not coincident, but have inlets 21 and feeders 20 disposed in an offset relationship to each other. If the inlets of first foil 25 and second foil 26 are offset by one inlet respectively, then inlets 21 of fluids A and B will be arranged in the checkerboard pattern shown in FIG. 6, the inlets being oriented at an angle of 90° with respect to 30 (see also FIGS. 7a through c).

However, in order to promote laminar mixing of the aforementioned fluid flow filaments, inlets 21 of fluids A and B are ideally oriented parallel to each other in the mixing chamber (see also FIG. 5). It is convenient for this purpose to use angles greater than 0°, preferably of between 45 and 90°.

On the other hand, it is preferred for the angles to be different from each other and for the fluid flow filaments to cross each other when it is desired to produce a turbulent flow condition directly at the inlets. In that case, the angular difference is preferably greater than 10°. If it is greater than 90°, the fluid flow filaments will flow in directions toward each other, thereby creating increased back pressure.

Foils 25 and 26, and thus the inlets (see also FIGS. 5 and 6) and outlets 22 (see also FIG. 5), are located in one of these end portions, respectively; the aforementioned guide structure 24 completely enclosing one end of the rotationally symmetrical mixing chamber 18. Analogous to the foils 25 and 26 shown in FIG. 5, the illustrated feeders 20 on second foil 26 have an offset with respect to openings 29. Therefore, if foils 25 and 26 are arranged in alternating sequence and if the inlets are offset by one inlet per plane (foil), inlets 21 will be arranged on mixing chamber wall 30 in a checkerboard pattern (see also FIGS. 6 and 7).

In the specific embodiment shown, the inlets are oriented toward the axis of symmetry, each forming a right angle therewith. Alternatively, the inlets may also be arranged skew to the axis of symmetry. In a rotationally symmetrical mixing chamber, this defines a direction of flow, preferably one that describes a helical path, in particular in the outer region of the mixing chamber. In this context, it may be convenient to configure the mixing chamber as an annular gap volume and/or to arrange the outlets in the direction of flow. Preferably, the outlets are located outside of the axis of symmetry. If all inlets for both of the fluid fractions are arranged such that they have substantially the same geometric orientation with respect to the axis of symmetry, then this will promote laminar mixing of the fluid flow filaments in the manner described above.

It is optionally possible to adjust the temperature of components of the static micromixer; i.e., to heat or cool the same, such as, in particular, the region of outlets 22 and the discharge lines downstream thereof, but selectively also the feeders and inlets for a fluid fraction. Unwanted effects of higher temperature and pressure gradients, such as cavitation or changes in the state of aggregation, which may occur when fluid flow filaments of the fluids pass from the inlets into the mixing chamber, can be reduced by adjusting the temperature of the inlets.

FIGS. 8a and b illustrate the basic design of a reactor. As shown in FIG. 8a, the reactor includes a mixer system 31 having connection ports 3 and 4 for fluids A and B, respectively, and a reactor unit 32 fluidically connected downstream thereof. The reactor unit has an intake port 33 (see FIG. 8*a*) and a discharge port for a temperature-adjusting medium D (such as cooling water), as well as a reaction volume outlet area 36 for reaction product C.

Figure 8B:
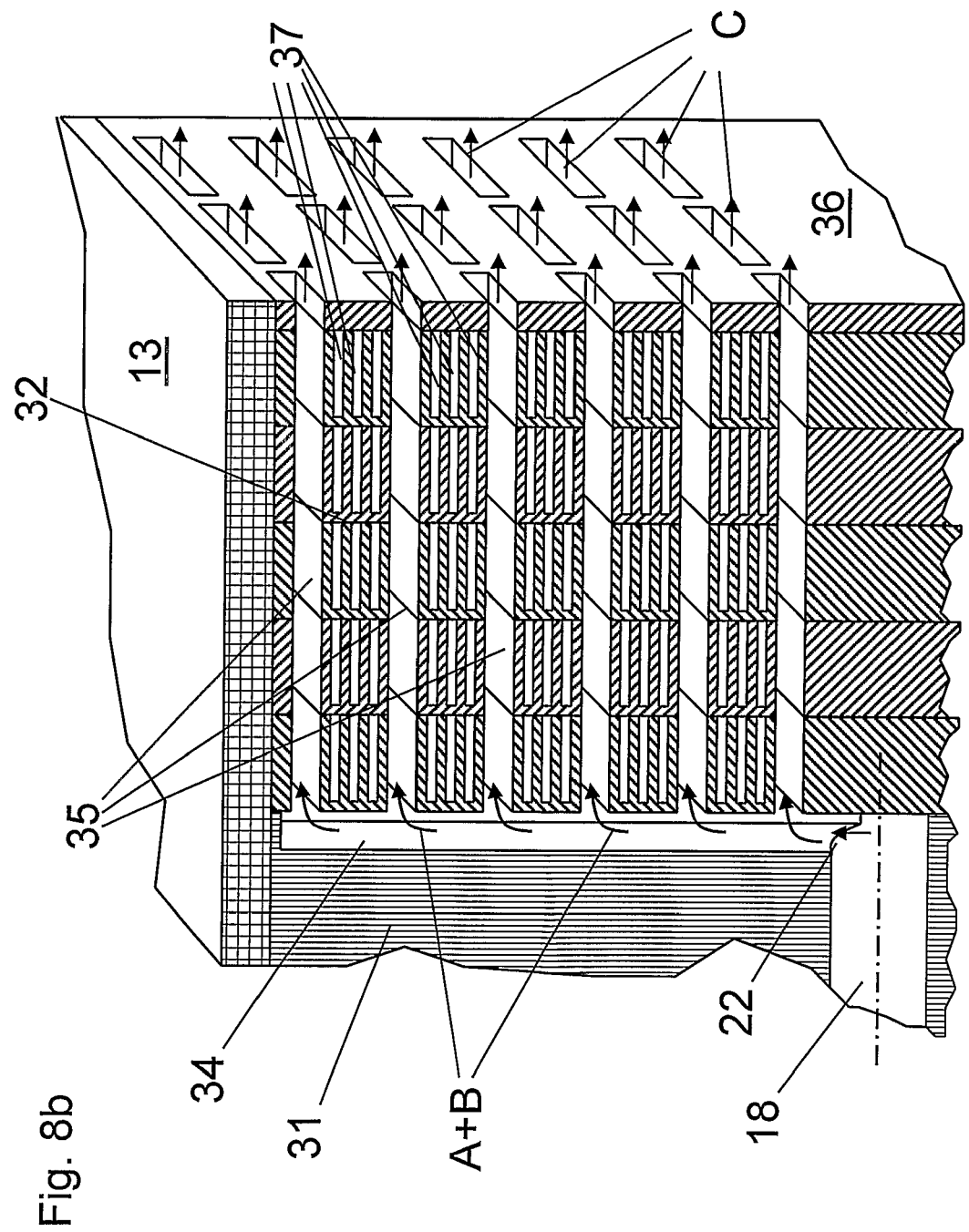
FIGS. 8a and b are perspective and partial cross-sectional schematic views, respectively, of a reactor including a mixer system.

FIG. 8*b* is a schematic, partial cross-sectional, perspective view of components of the reactor. After fluids A and B are supplied into mixer system 31, they are mixed to form mixture A+B and then introduced into reactor unit 32, in which said fluid mixture reacts chemically to produce reaction product C. The flow direction of the fluid mixture and reaction product from the mixing chamber 18 of a micromixer via an outlet 22 into a distribution channel 34, and further into the reaction channels 35 serving as a reaction volume, and further to reaction volume outlet area 36, is shown by a plurality of arrows (denoted A+B and C) in FIG. 8*b*. In reaction unit 32, the walls surrounding reaction channels 35 are penetrated by temperature-adjusting channels 37 for temperature-adjusting medium D, whereby this region is configured similarly to a countercurrent heat exchanger. Depending on the flow velocity profile required for the reaction kinetics, reaction channels 35 may have a cross-sectional area which is constant or varies with the progress of the reaction; i.e., a widening or tapering cross-sectional area. Under certain geometric, thermal and/or reaction-kinetic boundary conditions, it is also useful for the reaction channels to have branches and junctions.

Figure 9:
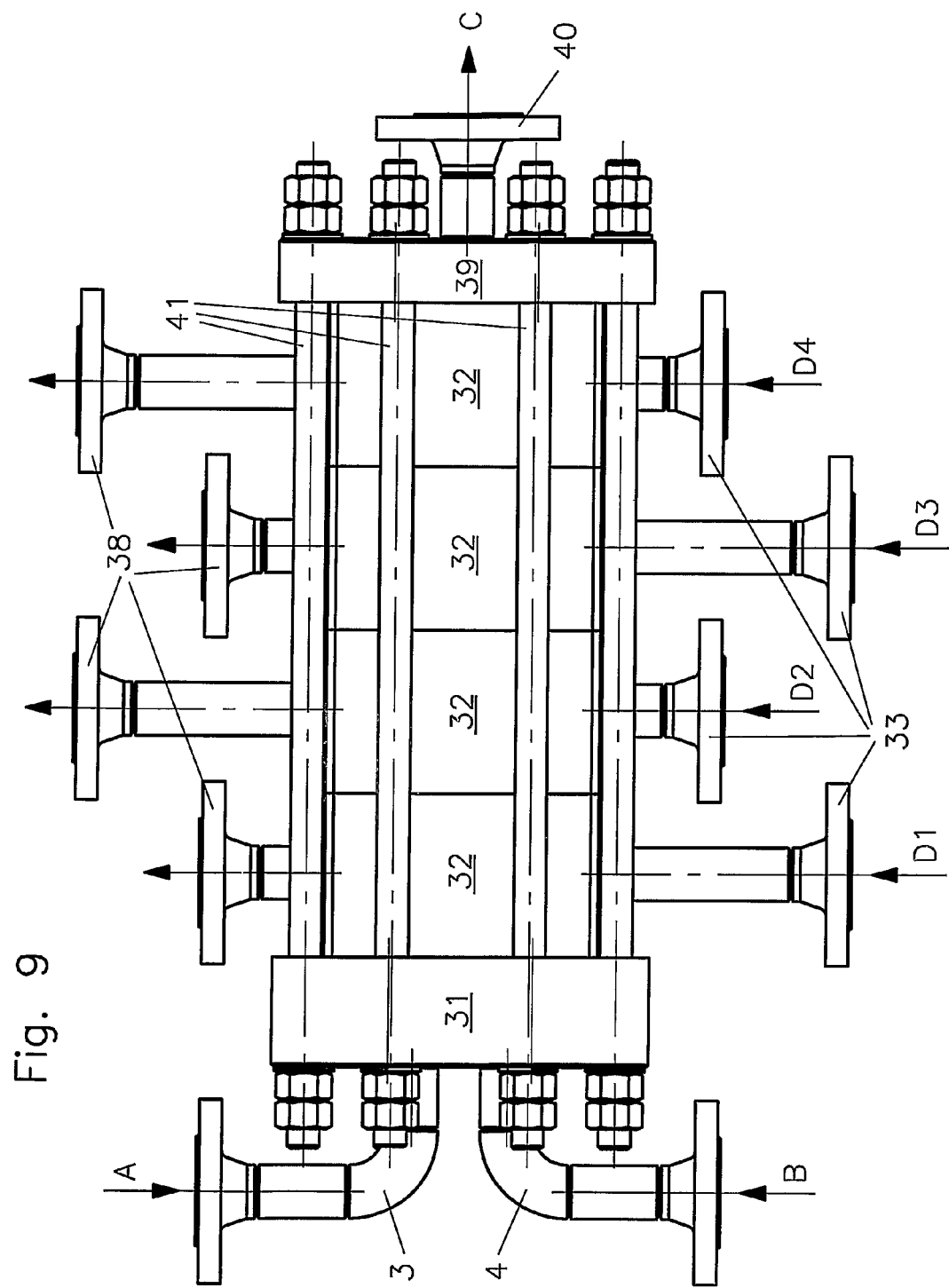
FIG. 9 is a view of an embodiment of a reactor including several reaction volumes arranged in series.
Figure 10:
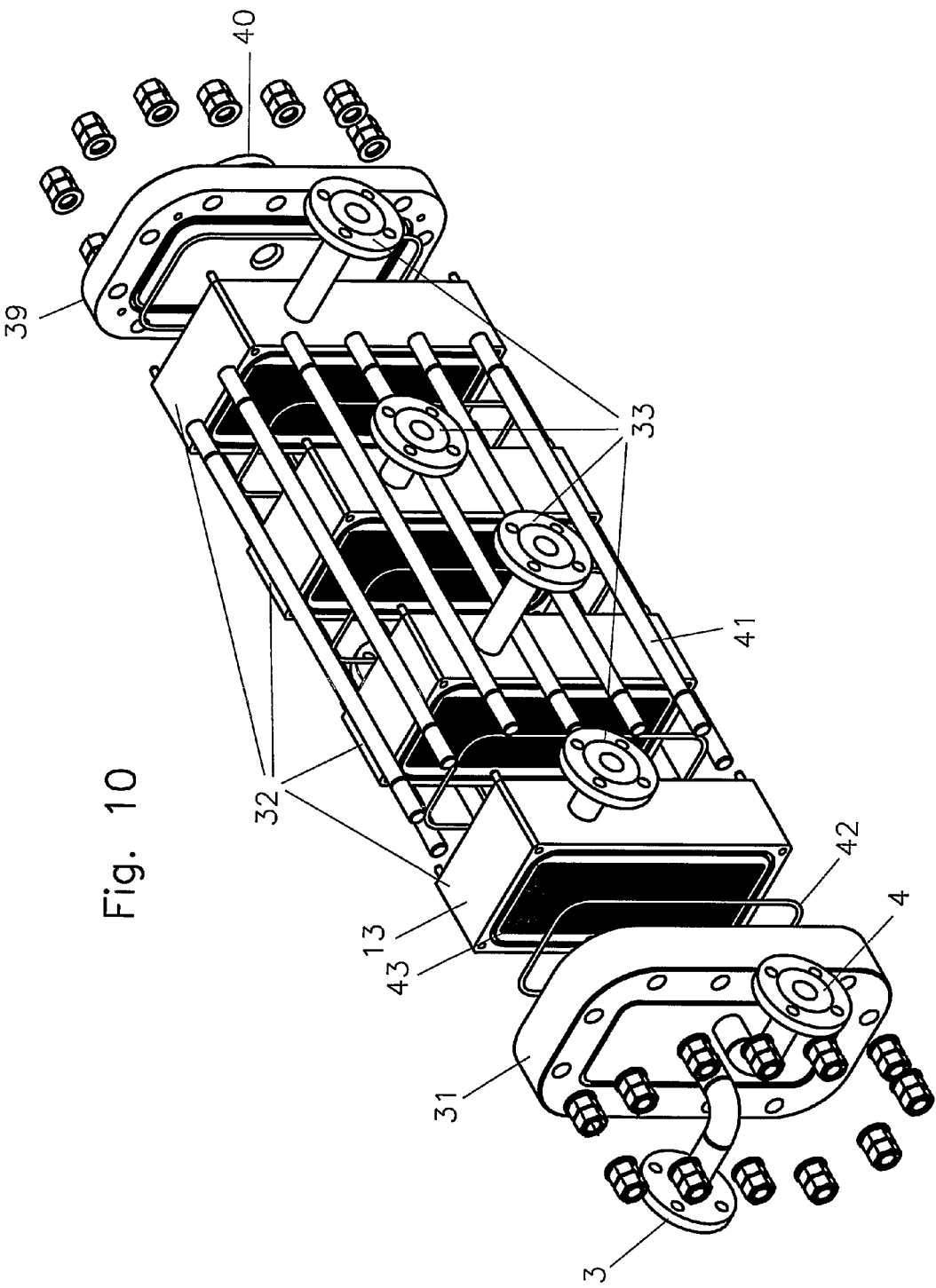
FIG. 10 is a perspective exploded view of the reactor of FIG. 9.

One embodiment of a reactor for carrying out a so-called Ritter reaction of the base fluids sulfuric acid (fluid A) and an organic mixture (fluid B) is shown in FIGS. 9 and 10. The temperature-adjusting medium (cooling medium) used is water (or an aqueous solution) having an inlet temperature of between 5 and 100° C. The reactor includes a mixer system 31 having connection ports 3 and 4 for fluids A and B, respectively, and further includes four downstream reaction units 32, which are connected in series and provided with intake ports 33 and discharge ports 38 for a temperature-adjusting medium D1 to D4, respectively. The last reaction unit has an end module 39 connected downstream thereof, said end module having a connection port for reaction product C. Reaction units 32 and mixer system 31 each include, in the aforementioned manner, a stack 43 of structured metal sheets (1 mm thick), which are diffusion welded together and inserted in a fluid-tight manner as inserts into a box-shaped housing 13 made of corrosion- and acid-resistant steel, respectively, said housing being open on both sides. The channel structures between the temperature-adjusting channels in the stack and the intake and discharge ports are provided either on the housing or in the aforementioned stack. Reactor units 32 are clamped together between mixer system 31 and end module 39 by means of reduced shank bolt connections 41. A seal 42, preferably of PTFE, is placed in grooves between the individual housings 13, respectively, to prevent the involved fluids from escaping.

In the above-mentioned embodiment, optional means are provided to adjust the residence time of a fluid mixture between the outlets of the mixer system and the reactor volume. In the simplest case, these means are constituted by a displacer in the form of a plate-like insert, preferably of PTFE, which is simply placed in the space between mixer system 31 and first reactor unit 32 during assembly. In this manner, the volume between the two aforementioned components is reduced and, as a consequence, the residence time of fluid mixture A+B can be adjusted to a certain extent according to the size of the insert. Preferably, the insert has fluid-guiding means and/or fluid distribution structures between the outlets and the reactor volume. Similarly, the aforementioned seals 42 or guides for the adjacent components may also be integrated in the displacer. Furthermore, the aforementioned means may also be used for adjusting the residence time between two other components, such as between two reactor units.

The aforementioned embodiment serves as a production reactor, and is therefore designed, built and tested in accordance with the requirements of Pressure Equipment Directive 97/23/EC (category II, fluid group 1) as specified in the AD 2000 Code. All connection ports 3, 4 and 39, as well as the above-mentioned intake ports 33 and discharge ports 38, are designed as welding neck flanges DN25 PN16 in accordance with DIN 2633. The dimensions (without connections) (L×W×H) are 735×487×415 mm; the maximum permissible pressure for the fluids, the fluid mixture and the reaction product is 16 bar, the permissible temperature range is between 5 and 100° C. In the aforementioned Ritter reaction, a pressure drop of 1 to 2 bar is specified for an inlet pressure of 4 to 6 bars of the base fluids A and B.

An advantage of this embodiment lies in its modular design with standardized mixer systems, reactor units and end modules, and in the particularly flexible handling and capability of conversion provided by the aforementioned reduced shank bolt type connections. It is possible and easy to add further components, such as admixing modules or liquid or gas separators.

Thus, for example, a reactor system may be formed by fluidically connecting two reactors in series in such a manner that at least one of connection ports 3 or 4 of the downstream reactor is connected to the connection port 40 of the upstream reactor. In this reactor system, an additional fluid may be admixed via a connection port 3 or 4 that is not yet connected to an upstream reactor; the respective mixer system is thus used as an admixing module. In the embodiment shown in FIGS. 9 and 10, this may also be achieved technologically in that a mixer system having geometrically adapted connection ports 3 and 4 is additionally interposed between two of the illustrated reaction units.

Another embodiment of a reactor which, as a whole, is designed as a composite layer structure (stack) of the aforementioned type is shown in FIG. 11 in a schematic cross-sectional view. The basic design of this reactor is similar to that of all the aforementioned reactors (see the reference numerals), but has coolant channels 37, the effect of which also extends over the regions of mixing chambers 18, feed lines 11, inlets 21, and outlets 22. If such extents are selectively not desired, it is possible to provide heat barriers in the form of local layer interruptions in one or more layer planes. The advantage of this reactor resides in its compact design, which makes this system particularly suitable for use in microtechnology.

The present invention is also suitable for mixing more than two base fluids. In that case, the fluids are either simultaneously or sequentially introduced into a mixing chamber, or the fluid mixture is produced by a plurality of micromixers connected in series. Furthermore, it is also possible to produce intermediate reaction products and introduce the same into an admixing device or into a mixer system, while using a reactor system of the aforementioned type.

What is claimed is:

1. A mixer system for mixing at least two fluids, the mixer system comprising:
   a guide matrix;
   a plurality of micromixers, the micromixers fluidically connected in parallel and integrated into the guide matrix; and feed lines for the fluids to be mixed, the micromixers fluidically connected in the guide matrix via the feed lines, wherein the micromixers are insertable as separate and individually replaceable micromixer inserts into the guide matrix in a form-fitting manner, and wherein the micromixer inserts are configured in the shape of a cylinder having lateral surface and toad surfaces, the feed lines for the fluids penetrating at least one of the lateral surface and one of the two end surface, at least one outlet penetrating the respective other end surface or lateral surface.

2. The mixer system as recited in claim 1, wherein the micromixers are substantially identical.

3. The mixer system as recited in claim 1, wherein the micromixers each include a mixing chamber having feeders for at least two fluids to be mixed or dispersed, the feeders each having at least one inlet to the mixing chamber, each mixing chamber having at least one outlet, the inlets disposed in alternating sequence in at least one plane, each mixing chamber configured to be rotationally symmetrical with respect to an axis of symmetry and having first and second end portions, the outlets and inlets disposed in one of the end portions, respectively.

4. The mixer system as recited in claim 3, wherein the outlets are disposed outside of the axis of symmetry.

5. The mixer system as recited in claim 3, wherein the inlets are arranged in at least two planes, the inlets of one plane offset with respect to those in the respective adjacent plane.

6. The mixer system as recited in claim 4, wherein the inlets are arranged in at least two planes, the inlets of one plane offset with respect to those in a respective adjacent plane.

7. The mixer system as recited in claim 3, wherein each of the inlets is associated with at least one of the at least two fluids and is oriented at an angle with respect to a wall of the mixing chamber, the angle between 0 and 90°.

8. The mixer system as recited in claim 3, wherein each of the inlets is in a form of a foil provided with a groove, the feeders provided for each of the at least two fluids fluidically interconnected via fluid channels including openings formed one above the other in the foils.

9. The mixer system as recited in claim 3, wherein the axis of symmetry is oriented orthogonally to the at least one plane.

10. The mixer system as recited in claim 3, wherein each of the outlets is disposed skew to the respective axis of symmetry.

11. The mixer system as recited in claim 3, wherein each of the inlets associated with at least one of the at least two fluids, and wherein the inlets are disposed such that they have substantially a same orientation with respect to the respective axis of symmetry.

12. The mixer system as recited in claim 3, wherein the inlets define a flow direction in the respective mixing chamber, and the outlets are arranged such that they each have substantially a same orientation with respect to the respective axis of symmetry.

13. The mixer system as recited in claim 3, wherein the outlets are oriented in one direction of flow.

14. A reactor, comprising:
a mixer system for mixing at least two fluids, the mixer system including: a guide matrix; a plurality of micromixers, the micromixers fluidically connected in parallel and integrated into the guide matrix; and feed lines for the fluids to be mixed, the micromixers fluidically connected in the guide matrix via the feed lines, wherein the micromixers each include a mixing chamber having feeders for at least two fluids to be mixed or dispersed, the feeders each having at least one inlet to the mixing chamber, each mixing chamber having at least one outlet, the inlets disposed in alternating sequence in at least one plane, each mixing chamber configured to be rotationally symmetrical with respect to an axis of symmetry and having first and second end portions, the outlets and inlets disposed in one of the end portions, respectively;

at least one reactor volume connected to the outlets of the mixer system; and an arrangement configured to adjust a residence time of a fluid mixture between the outlets of the mixer system and the reactor volume.

15. The reactor as recited in claim 14, wherein the arrangement includes at least one displacer between the outlets and the reactor volume.

16. The reactor as recited in claim 14, wherein at least one of the reactor volume and the outlets has a temperature-adjusting device.

17. The reactor as recited in claim 16, wherein the temperature-adjusting device includes a microchannel structure configured to conduct a flow of a temperature-adjusting medium therethrough.

18. A reactor system, comprising:
at least two reactors fluidically connected in series, each reactor including a mixer system for mixing at least two fluids, the mixer system including: a guide matrix; a plurality of micromixers, the micromixers fluidically connected in parallel and integrated into the guide matrix; and feed lines for the fluids to be mixed, the micromixers fluidically connected in the guide matrix via the feed lines, wherein the micromixers each include a mixing chamber having feeders for at least two fluids to be mixed or dispersed, the feeders each having at least one inlet to the mixing chamber, each mixing chamber having at least one outlet, the inlets disposed in alternating sequence in at least one plane, each mixing chamber configured to be rotationally symmetrical with respect to an axis of symmetry and having first and second end portions, the outlets and inlets positioned in one of the end portions, respectively; at least one reactor volume connected to the outlets of the mixer system; and an arrangement configured to adjust the residence time of a fluid mixture between outlets of the mixer system and the reactor volume, the reactor volume of a first of the reactors connected to a first of the feeders of a second of the reactors.

* * * * *